US012716981B2

(12) United States Patent
Nawaz et al.

(10) Patent No.: US 12,716,981 B2
(45) Date of Patent: Aug. 25, 2026

(54) TRANSITION DETECTION

(71) Applicant: Navenio Ltd., Oxford (GB)

(72) Inventors: Sarfraz Nawaz, Oxford (GB); Agathoniki Trigoni, Oxford (GB); Sean Maguire, Oxford (GB); Apostolos Livanios, Oxford (GB); Emre Ay, Oxford (GB)

(73) Assignee: Navenio Ltd., Oxford (GB)

( * ) Notice: Subject to any disclaimer, the term of this patent is extended or adjusted under 35 U.S.C. 154(b) by 0 days.

(21) Appl. No.: 17/439,460

(22) PCT Filed: Mar. 18, 2020

(86) PCT No.: PCT/GB2020/050712
§ 371 (c)(1),
(2) Date: Sep. 15, 2021

(87) PCT Pub. No.: WO2020/188275
PCT Pub. Date: Sep. 24, 2020

(65) Prior Publication Data

US 2022/0155402 A1 May 19, 2022

(30) Foreign Application Priority Data

Mar. 20, 2019 (GR) ............................. 20190100131
Apr. 24, 2019 (GB) ..................................... 1905688

(51) Int. Cl.
*G01S 5/00* (2006.01)
*G01C 21/00* (2006.01)
*G01C 21/20* (2006.01)

(52) U.S. Cl.
CPC ........... *G01S 5/012* (2020.05); *G01C 21/206* (2013.01); *G01C 21/3841* (2020.08)

(58) Field of Classification Search
CPC ........ G01S 5/012; G01S 5/0269; G01S 5/014; G01S 5/015; G01S 5/016; G01C 21/206;
(Continued)

(56) References Cited

U.S. PATENT DOCUMENTS

2013/0282269 A1* 10/2013 Hannukainen ..... G01C 21/3484 701/400
2013/0332064 A1 12/2013 Funk et al.
(Continued)

FOREIGN PATENT DOCUMENTS

EP 2775260 A1 9/2014
WO 2011091298 A1 7/2011
(Continued)

OTHER PUBLICATIONS

G. H. Lee and M. Pollefeys, "Unsupervised learning of threshold for geometric verification in visual-based loop-closure," 2014 IEEE International Conference on Robotics and Automation (ICRA), Hong Kong, China, 2014, pp. 1510-1516, doi: 10.1109/ICRA.2014.6907052. (Year: 2014).*
(Continued)

*Primary Examiner* — Faris S Almatrahi
*Assistant Examiner* — Selena M Jin
(74) *Attorney, Agent, or Firm* — Boyle Fredrickson S.C.

(57) ABSTRACT

A computer implemented method (400) of determining a location of one or more transitions (5*a-e*) on a map and/or the time at which one or more transitions (5*a-e*) occurs, the one or more transitions (5*a-e*) made by a set of mobile computing devices (13*a-c*), from a first zone (2) to a second zone (4), the method (400) comprising: obtaining (402) trajectory data representing a plurality of trajectories (302 *a, b*) collected from one or more mobile computing devices (13 *a-c*), at least some of the trajectories (302 *a, b*) passing through the first zone (2) and/or the second zone (4);
(Continued)

positioning (404) the trajectories (302 *a, b*) in a frame of reference defined relative to the map, wherein at least part of at least some of the trajectories (302 *a, b*) are positioned based on correspondence with other trajectories (302 *a, b*); and processing the plurality of trajectories (302 *a, b*) positioned in the frame of reference defined relative to the map to determine the location and/or time.

26 Claims, 6 Drawing Sheets

(58) Field of Classification Search
CPC . G01C 21/3841; G06F 16/29; G06F 16/2465; H04W 4/029; H04W 4/33
See application file for complete search history.

(56) References Cited

U.S. PATENT DOCUMENTS

2014/0335893 A1* 11/2014 Ronen ................. G01S 5/02524 455/456.1
2015/0285656 A1 10/2015 Verheyen et al.
2015/0308839 A1* 10/2015 Jiang .................... G01C 21/383 702/5
2016/0061607 A1* 3/2016 Yang .................... G01C 21/206 701/400
2016/0080911 A1 3/2016 Kay et al.
2016/0084658 A1* 3/2016 Chao .................... G01C 21/206 701/533
2016/0102986 A1 4/2016 Ma et al.
2016/0195400 A1 7/2016 Young et al.
2016/0371394 A1* 12/2016 Shahidi ............... G01S 5/02526
2017/0146349 A1* 5/2017 Yang ...................... G01C 21/14
2019/0301873 A1* 10/2019 Prasser .............. G01C 21/3848
2019/0373413 A1* 12/2019 Kong ...................... H04W 4/33
2020/0025581 A1* 1/2020 Ramasamy ........ G01C 21/3438
2021/0097739 A1* 4/2021 Xie ...................... H04W 4/029

FOREIGN PATENT DOCUMENTS

WO 2016042296 A2 3/2016
WO 2019025788 A1 2/2019

OTHER PUBLICATIONS

Examination Report for Application No. GB1905688.6; dated Nov. 10, 2022; 4 pages.
Examination Report for Application No. GB1905688.6; dated Nov. 3, 2022; 4 pages.
Linhai Xie, Sen Wang, Andrew Markham, and Niki Trigoni; Graph Tinker: Outlier Rejection and Inlier Injection for Pose Graph SLAM, 8 pages.
Donnie H. Kim, Jeffrey Hightower, Ramesh Govindan, and Deborah Estrin; Discovering Semantically Meaningful Places from Pervasive RF-Beacons, UbiComp 2009, Sep. 30-Oct. 3, 2009, 10 pages.
International Search Report and Written Opinion for International Application No. PCT/GB2020/050712, dated Sep. 22, 2020, 26 pages.
Search Report for Application No. GB1905688.6, dated Oct. 22, 2019, 4 pages.
Examination Report for Application No. GB1905688.6; May 17, 2023; 3 pages.

* cited by examiner

TRANSITION DETECTION

This application is a 371 of international PCT/GB2020/050712, filed Mar. 18, 2020, which claims priority to GB Patent Application No. 1905688.6, filed on Apr. 24, 2019, and GR patent application No. 20190100131, filed on Mar. 20, 2019, the contents of each of which are hereby incorporated by reference.

The present disclosure relates to systems and methods for determining a location of one or more transitions and/or the time at which one or more transitions occurs, the one or more transitions between a first zone and a second zone on a map. In particular, but not exclusively, the present disclosure relates to systems and methods for determining transitions between indoor and outdoor zones. Such transitions may be formed by, for example, doorways.

Maps often provide outlines of buildings but do not include the locations of entrances to and exits from the buildings. Mobile computing devices, such as mobile phones, may be used to map an area to provide greater detail, such as the position of doorways. However, in close proximity to buildings, the accuracy of Global Navigation Satellite Systems (GNSSs) means that it is not possible to accurately determine if the mobile computing device is in or out of the building, and where it has passed through a doorway.

FIG. 1 schematically illustrates a map with a plan of a building 1. The building 1 has a perimeter formed by an exterior wall 3. The building 1 has five doorways 5*a-e* forming transitions between an interior zone 2 of the map and an exterior zone 4.

FIG. 1 shows a number of trajectories 7*a-c* of users carrying corresponding mobile computing devices 13*a-c* whilst walking. The trajectories 7*a-c* are the true paths of the users, and hence the mobile devices 13*a-c*.

FIG. 1 also shows a first series of data points 9*a* collected by the first mobile device 13*a*, a second series of data points 9*b* collected by a second mobile device 13*b*, and a third series of data points 9*c* collected by a third mobile device 13*c*. The data points 9*a-c* represent GNSS data providing the position of the mobile devices 13*a-c* relative to the building 1. The GNSS data is taken at regular intervals. Each data point may correspond to a GNSS reading, or multiple readings may be averaged to provide a data point.

The first trajectory 7*a* enters the building at a second door 5*b*. However, the GNSS data points 9*a* cross the wall 3 of the building 1 near the first door 5*a*, rather than going through a door 5*a-e*.

The second trajectory enters the building at the third door 5*c*, but an estimated trajectory based on the GNSS readings 9*b* would likely be determined to enter the building between the second door 5*b* or third door 5*c*.

The third trajectory 9*c* enters the building at fifth door 5*e*. However, the GNSS position data is lost when the mobile computing device 13*c* passes between the building 1 and another nearby building 11. Therefore, the GNSS readings 9*c* are more likely to show the device entering the building through the fourth doorway 5*d*.

As used herein, the terms "door" and "doorway" are intended to cover any opening, entrance or exit of a building, including, for example, sliding windows, patio doors, rotating doors, archways and the likes, whether or not an openable barrier (such as a door, garage door, gate or window) is present in the opening. "Entrance" may be used for an entrance or exit.

Furthermore, doorways are just one example of a transition between different zones (outdoor and indoor) of a map. Transitions, such as doorways, may also be formed by interior doorways, entrances and exits to tunnels, changes between different areas of a region and the like.

The skilled person will appreciate that there are various examples of GNSS data, including Global Positioning System (GPS), Global Navigation Satellite System (GLONASS), Galileo or BeiDou data, and that any such GNSS data may be used. A combination of different types of GNSS data may be used in some embodiments.

According to a first aspect, there is provided a computer implemented method of determining a location of one or more transitions on a map and/or the time at which one or more transitions occurs, the one or more transitions made by a set of mobile computing devices, from a first zone to a second zone, the method comprising at least one of the following steps:

- obtaining trajectory data representing a plurality of trajectories collected from one or more mobile computing devices, at least some of the trajectories passing through the first zone and/or the second zone;
- positioning the trajectories in a frame of reference defined relative to the map, wherein at least part of at least some of the trajectories are positioned based on correspondence with other trajectories; and
- processing the plurality of trajectories positioned in the frame of reference defined relative to the map to determine the location and/or time of transitions from first zones of the map to second zones of the map.

Processing the plurality of trajectories positioned in the frame of reference defined relative to the map to determine the location and/or time of transitions from first zones of the map to second zones of the map may comprise: identifying candidate transitions in each trajectory; and determining transitions based on groupings of candidate transitions.

Candidate transitions may be determined based on a signal gradient of a signal received at the one or more mobile computing devices exceeding a threshold. The received signal may comprise one or more of: WiFi; a GPS signal; a cellular communications signal.

Candidate transitions may be determined based on where trajectories cross boundaries defined on the map. A candidate transition may be identified when the trajectory crosses the boundaries defined on the map at an angle exceeding a threshold.

Processing the plurality of trajectories positioned in the frame of reference defined relative to the map to determine the location of transitions from first zones of the map to second zones of the map may comprise: identifying regions where a group of trajectories cross a boundary defined in the map.

The computer implemented method may comprise determining the location of a transition, in the frame of reference defined relative to the map.

The trajectories may be determined based at least in part on inertial data from the one or more mobile computing devices. A subset of the trajectories may be determined without any position data relative to the map. At least some of the trajectories may be non-overlapping in the frame of reference of the map.

Positioning the trajectories in a frame of reference defined relative to the map may comprise: processing the plurality of trajectories to position the trajectories relative to each other in a common relative co-ordinate space; processing the trajectories to transform the relative co-ordinate space into the frame of reference defined relative to the map. In some cases, the two steps above could be combined into a single step.

Each trajectory may include a plurality of position points, and positioning the trajectories in a frame of reference defined relative to the map may comprise: determining three or more points on the trajectories having a fixed position in the frame of reference of the map; and positioning the points without fixed position in the frame of reference of the map based on the trajectories and correspondence between features of the trajectories. The three or more points may be taken from one or more of the plurality of trajectories.

Correspondence of trajectories may be determined based at least in part on features of signals sensed by the one or more mobile computing devices along the trajectories. The received signal may comprise one or more of: WiFi; a GPS signal; a cellular communications signal; an IMU (inertial measurement unit) signal.

Correspondence of trajectories may be determined based at least in part on position data of the trajectories in the frame of reference of the map and optionally on position data of features of the map.

Positioning the trajectories in a frame of reference defined relative to the map may comprise using a Simultaneous Localisation and Mapping module to process the plurality of trajectories.

The method may comprise using the Simultaneous Localisation and Mapping module to process the plurality of trajectories to position the trajectories relative to each other in a common relative co-ordinate space.

The first zone and the second zone may comprise indoor and outdoor regions of the map, such that the transitions comprise an indoor/outdoor transition.

At least a portion of each of the trajectories may be within a geo-fence defined in the frame of reference of the map, the geo-fence incorporating the first zone and the second zone.

According to a second aspect, there is provided an apparatus for determining a location and/or time of one or more transitions on a map, made by a set of mobile computing devices, from a first zone to a second zone, the apparatus comprising: a transition detector comprising processing circuitry arranged to perform the method of the first aspect.

According to a third aspect, there is provided computer-readable medium containing instructions which, when run on a system including processing circuitry, cause that system to:

(i) implement the method of the first aspect; and/or (ii) perform as the apparatus of the second aspect.

The skilled person would understand that features described with respect to one aspect of the invention may be applied, mutatis mutandis, to any other aspect of the invention.

The machine readable medium referred to in any of the above aspects of the invention may be any of the following: a CDROM; a DVD ROM/RAM (including −R/−RW or +R/+RW); a hard drive (including a Solid State Drive (SSD)); a memory (including a USB drive; an SC card; a compact flash card or the like); a transmitted signal (including an Internet download, ftp file transfer of the like); a wire; etc.

Additionally, the skilled person will appreciate the duality of hardware and software. As such, whilst some aspects/embodiments described herein are described as being performed by software, or by hardware, the skilled person will appreciate that this need not be the case and many portions of aspects/embodiments may be performed by hardware, software, firmware or a combination of both.

There now follows by way of example only a detailed description of embodiments of the present invention with reference to the accompanying drawings in which:

FIG. 1 schematically illustrates a plan view of a building with a number of trajectories of mobile device and corresponding GNSS positioning data;

FIG. 2 schematically illustrates an example of a mobile device;

FIG. 3 schematically illustrates an example of a processing system;

FIG. 4 illustrates a method of processing mobile device trajectories to determine transitions into and out of a building;

FIG. 5A schematically illustrates the loop closure process for two example trajectories;

Figure 1:
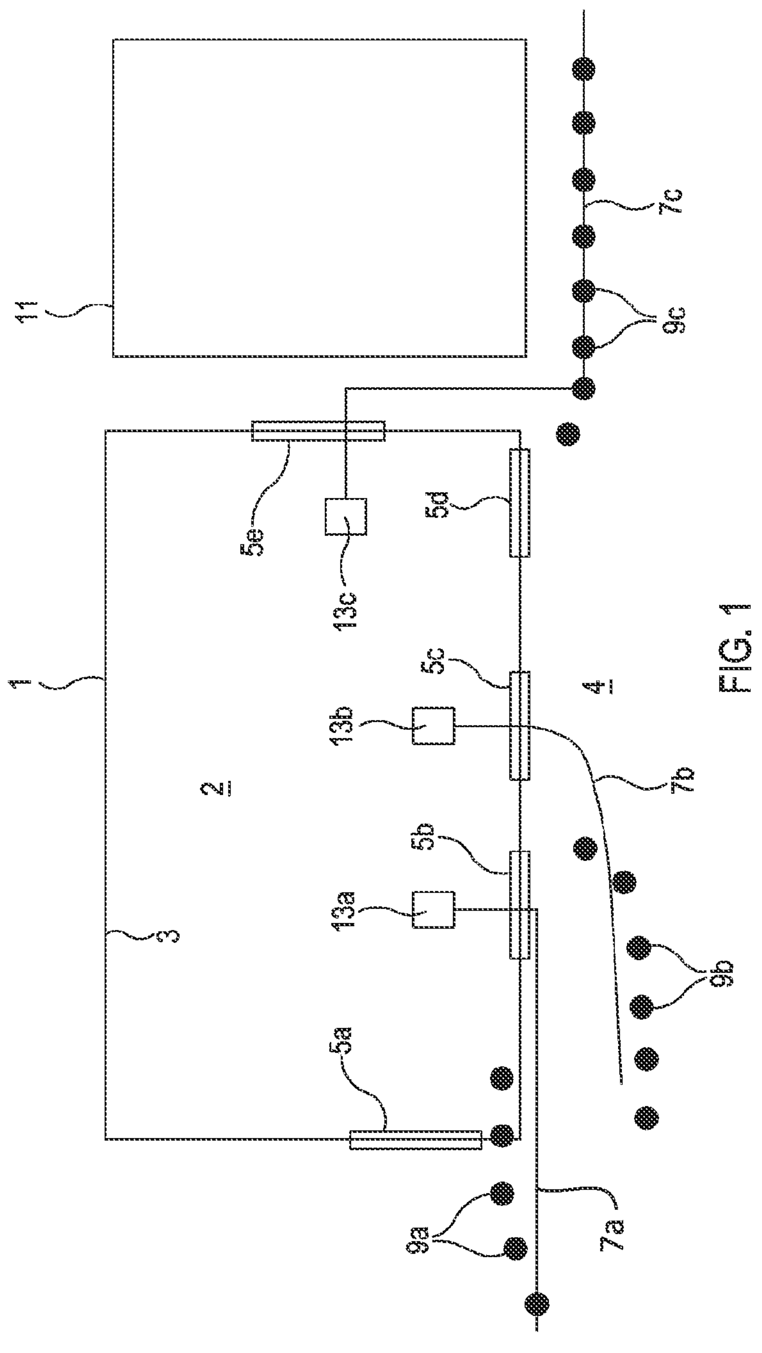
Figure 2:
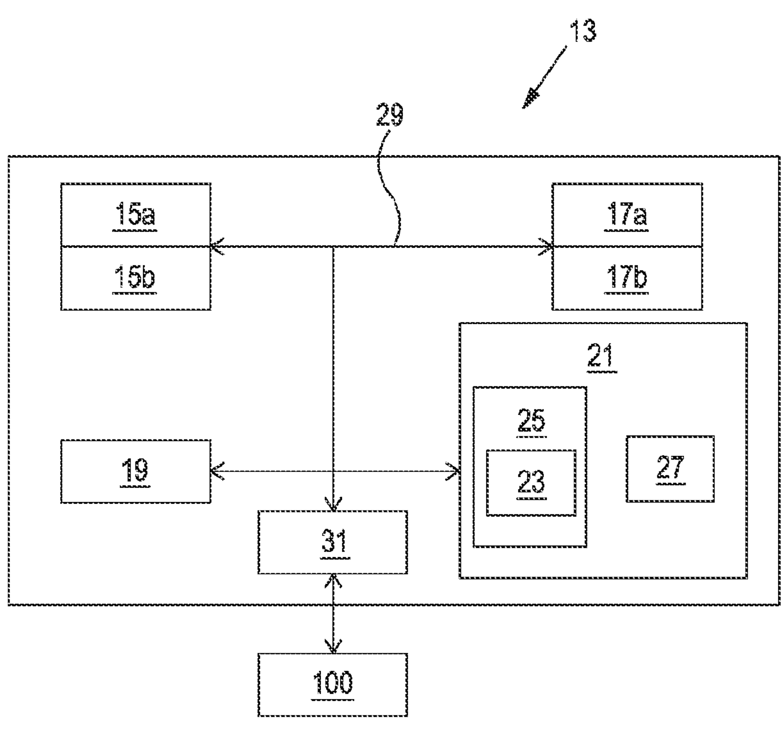

FIG. 2 illustrates a schematic view of some of the components of a mobile device 13 used for determining the location of transitions 5*a-e* between different zones 2,4 on a map.

The mobile devices 13*a-c* may be smart phones. The skilled person will appreciate that the mobile devices 13*a-c* may be any device capable of being moved around a building 1, and of detecting GNSS data and processing data, and/or sending on the GNSS data for processing elsewhere. The mobile devices 13*a-c* may therefore be or comprise any suitable smart phone, tablet, portable computer (e.g. laptop), smart watch, Fitbit®, smart clothing, subdermal electronic device or implant, or the likes. In the embodiments being described, the mobile devices 13*a-c* are sufficiently small and light-weight to be carried in a hand or pocket. In other embodiments, the mobile devices 13*a-c* may be larger and/or heavier, and carried in a back-pack or on a trolley or the likes. Such a mobile device may be referred to as a portable mobile device. In still further embodiments, the mobile device may be a car or other vehicle, and the building 1 may be or comprise a car park or the likes.

The mobile device 13 comprises at least one receiver 15*a*, 15*b*, which may comprise, in various embodiments, a GNSS receiver and optionally one or more radio-communication signal receivers.

In one example, the radio-communication signal receiver may be a WiFi receiver. The person skilled in the art will understand that WiFi is specified for convenience only and the skilled person will appreciate that any other suitable communication data may be used instead the invention is therefore not to be limited to the use of WiFi. In alternative or additional embodiments Bluetooth® or other radio communication signals such as Digital Enhanced Cordless Telecommunications (DECT), Zigbee®, and the like may be used instead of or as well as WiFi.

The mobile device 13 may also comprise at least one sensor 17*a,b* such as an accelerometer, a gyroscope, a barometer (i.e. a pressure sensor), an ambient light sensor, a camera, a temperature sensor, and a compass, or similar.

Each of the receivers 15*a*, 15*b* and sensors 17*a,b* generates data. For example, the GNSS receiver (e.g. a GPS receiver) generates GNSS data, the radio communications receiver generates signal data, the accelerometer generates acceleration data, the barometer generates pressure data, the temperature sensor generates temperature data.

The mobile device 13 is arranged to process the data generated by the receivers 15*a,b* and sensors 17*a,b*. In the embodiment being described, in which the mobile device 13 is a smart phone, a software application 23 (often known as an App) is stored in a program storage portion 25 of the memory 21 of the device. The software application 23 comprises computer instructions, that when run on processing circuitry 19 of the mobile device 13 causes the mobile device 13 to store, from time to time, the data generated from at least some of the receivers 15*a,b* and sensors 17*a,b*. The generated data is stored in a data storage portion 27 of the internal memory 21 of the mobile device 13.

In the embodiment being described, the processing circuitry 19 or software application 23 is arranged to time stamp the data generated by the receivers 15*a,b* and sensors 17*a,b* as the data is received and/or processed by the processing circuitry 19. A sending unit 31 of the mobile device 13 is arranged to send the data to a processing unit 100 for further processing, as will be discussed below.

The processing circuitry 19 may be or comprise one or more of the following processors: A7, A8, A9, A10 or A11 processors from Apple®, Snapdragon, an Intel® X86 processor such as an 15, 17 processor, an IntelAtom, or the likes.

The memory may be provided by a cache memory, a RAM memory, a local mass storage device such as the hard disk. The memory may also be provided remotely, and connected to the processing circuitry 19 over a network connection.

The sensors 15*a,b*, receivers 17*a,b*, memory 21, sending unit 31 and processing circuitry 19 may be in communication over a system bus 29. In some cases, the function of the processing circuitry 19 and/or memory 21 may be distributed over a number of connected units. These units may be connected over any suitable network connection, as well as through the bus 29.

One or more network connections may be available to the sending unit 31 and network connection. This provides for data transfer; for example via the Internet, but the skilled person would appreciate that any suitable data transfer means may be used. For example, Wi-Fi, the Global System for Mobile communications (GSM) and/or the Universal Mobile Telecommunications System (UMTS) may be used. Whilst it is convenient to use a Wide Area Network (WAN) such as the Internet any data connection such as an ad-hoc network, a dedicated connection between the mobile device 13 and the processing unit 100, etc. may be used.

Figure 3:
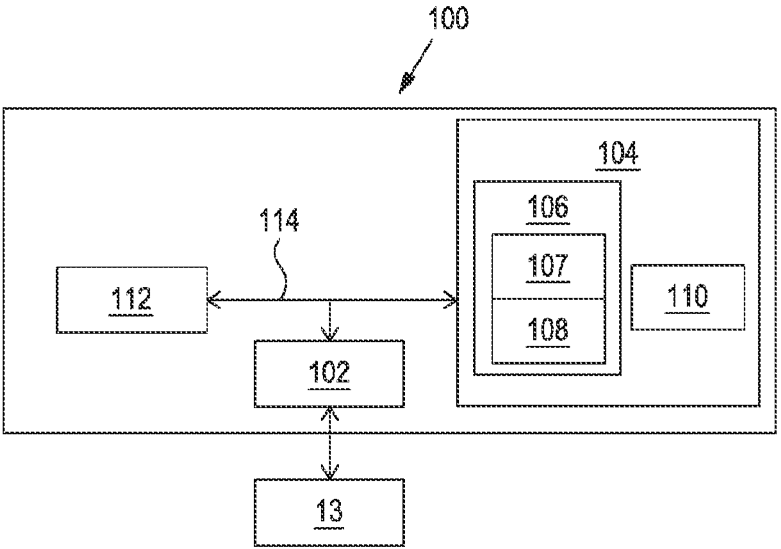

FIG. 3 schematically illustrates an example of the processing system 100. The processing system includes a communications interface 102, arranged to receive data transferred from one or more mobile devices as discussed in relation to FIG. 2.

The processing system 100 includes a memory 104, having a program storage portion 106 and a data storage portion 110. The data storage portion 110 is arranged to store the data received from the one or more mobile devices 13. The program storage portion 106 of the memory contains a trajectory module 107, and a transition detection module 108.

The trajectory module 107 and transition detection module 108 contain software instructions 108 that, when executed on the processing circuitry 112 of the processing unit 100, process the data provided by the mobile devices 13*a-c* as will be discussed in more detail below.

The processing circuitry 112, memory 104 and communications interface 102 are all in communication over a system bus 114. The processing circuitry 112, memory 104 and communications interface 102 may further be in communication via the communications interface 102, where the functionality of the memory 114 and processing circuitry is distributed.

The memory may be provided by a cache memory, a RAM memory, a local mass storage device such as the hard disk. The memory may also be provided remotely, and connected to the processing circuitry 19 over a network connection.

The processing circuitry 19 may be or comprise one or more of the following processors: A7, A8, A9, A10 or A11 processors from Apple®, Snapdragon, an Intel® X86 processor such as an IS, 17 processor, an IntelAtom, or the likes.

When executed on the processing circuitry 112 of the processing unit 100, the trajectory module 107 processes the data collected by the receivers 15*a,b* and sensors 17*a,b* of a particular device 13 to generate a trajectory along which that mobile device 13 is moved.

To obtain the trajectory for a mobile device 13, the data from that device 13 is processed to provide a time series comprising the time stamped position of the corresponding device 13 at intervals, referred to as position nodes. For example, the series may include nodes every millisecond, or at any other suitable regularity. The trajectory is formed by vectors extending between consecutive nodes. The position nodes may be generated using any available data, and may be defined in a frame relative to the mobile device 13.

Where accurate GNSS data is available, the position nodes may be based on the GNSS data. The position nodes may be based on a single GNSS reading, or multiple GNSS readings that are averaged. In other cases, where GNSS data is not available, or the accuracy is below a threshold, the positioned nodes may be determined based on other data measured by the receivers 15*a,b* and sensors 17*a,b*.

In one example, a position node in a trajectory may be determined based on a measured movement from the previous position node in the trajectory. This is a process known as pedestrian dead reckoning. By way of example, this may be based on one or more of: determining a direction of movement based on accelerometer, gyroscope, compass or other sensors; determining a speed of movement based on sensor readings; determining a stride count, and using a previously calibrated stride length.

In general, an odometry algorithm, such as dead reckoning, provides at each node a data pair comprising a translation (i.e. the distance moved from the previous node) and rotation (i.e. the relative orientation of the current step with respect to the previous step). In the example of pedestrian dead reckoning, the translation is referred to as a step length, and the rotation as a step turn. The node represents the position and orientation of the device at a given time, and may also be referred to as a pose.

WO 2016/042296, the contents of which are hereby incorporated by reference, discloses a method of pedestrian dead reckoning.

In at least some embodiments, further information may also be used to determine the location of position nodes in the trajectory. For example, signal fingerprints, or other known measurable features having fixed location may also be used to determine the position nodes. For example, a measured WiFi fingerprint may provide a distance and direction from a WiFi base station.

In at least some embodiments, a trajectory may be formed using position nodes generated by one, or a combination of two or more of the above techniques. Furthermore, the above description is given by way of example only. The trajectories may be determined by any suitable method.

In the embodiment being described, the trajectory is calculated at the processing unit 100. However, it will be appreciated that the trajectory module 107 may be provided in the mobile device(s) 13. Therefore, the data transmitted by the mobile devices 13 may include the calculated trajectory. The raw data from one or more of the receivers 15*a,b* and sensors 17*a,b* may be provided to the processing unit with the trajectory.

The transition detection module 108 includes software instruction that, when executed by the processing circuitry 112 of the processing unit 100, processes a collection of trajectories to identify the location of transitions between zones.

Figure 4:
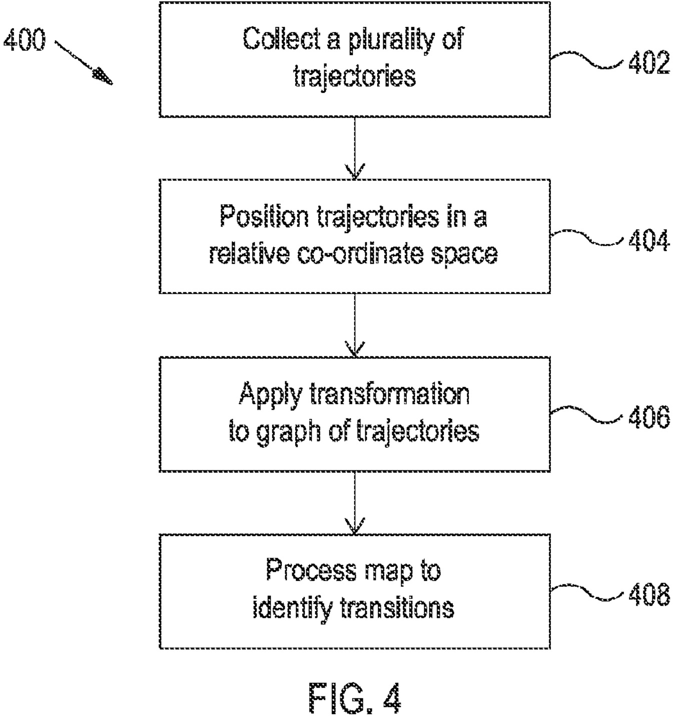

FIG. 4 illustrates one example of a method 200 of processing an ensemble of trajectories 302 together, in order to determine the location of transitions 5*a-e* into and out of a building 1 on a map 300. The method will be described with reference to FIGS. 5A to 5D.

At a first step 402, a plurality of trajectories 302 are collected. Each trajectory 302 is collected by a mobile device 13 as discussed above. The trajectories 302 are all taken in the vicinity of a building 1. For example, a geo-fence may be defined around the building 1. At least a portion of each of the trajectories may be within the geo-fence. The person skilled in the art will appreciate that a geo-fence provides a boundary defined relative to the map 300. Therefore, at least a portion of each trajectory is within a predetermined distance from the building 1.

Whilst the trajectories 302 are taken from the vicinity of the building 1, not all of the trajectories 302 necessarily cross through a transition into or out of the building 1. For example, there may be a first subset of trajectories the only extend outside the building 1, a second subset that only extend within the building, and a third subset that cross from outside to inside (or inside to outside).

At least some of the trajectories 302 overlap each other, but it will be appreciated that some trajectories 302 will overlap other trajectories 302. For example, a first trajectory may overlap a second trajectory but not a third, and the third trajectory may overlap the second (and not the first).

The trajectories 302 may be collected using one or more mobile device 13. The trajectories need not be collected simultaneously, and may be collected over a period of time. Therefore, it will be appreciated that one or more of the trajectories may be collected by the same mobile computing device 13

It will also be appreciated that a number of trajectories may be from a single journey of a mobile device 13, broken by periods where insufficient data to generate a trajectory is available. Furthermore, it will be appreciated that at least some of the trajectories 302 may not include any GNSS positioning data. Even where a trajectory 302 is provided with GNSS data, the GNSS data may not necessarily extend along the full length of the trajectory 302, and there may even be only a single GNSS data point along the length of a trajectory.

Each trajectory is defined in an independent reference frame. According to a second step of the method, the ensemble of trajectories 302 are combined on a single graph 308. Loop closure techniques can be used to position the trajectories relative to each other in a single co-ordinate space or frame of reference, by determining regions where the trajectories are at the same or similar positions (corresponding positions).

Any of the data received from receivers 15*a,b* and sensors 17*a,b* can be used to determine the loop closure. For example, loop closure may be achieved on the basis of GNSS position. Alternatively, loop closure may be achieved using a fingerprint of a received radio communication signal, such as WiFi, BlueTooth or Cellular Communications; determining of relative positions of trajectories from known landmarks (determined by measurement of beacons and the like from the landmarks, or image analysis); GNSS position data; light data; geomagnetic data; pedestrian dead reckoning data, and the like. Either single measurements or sequences of measurements of the above sensor or radio data can be used for loop closures. A combination of the above sensor or radio data can be applied for loop closure detection.

Figure 5A:
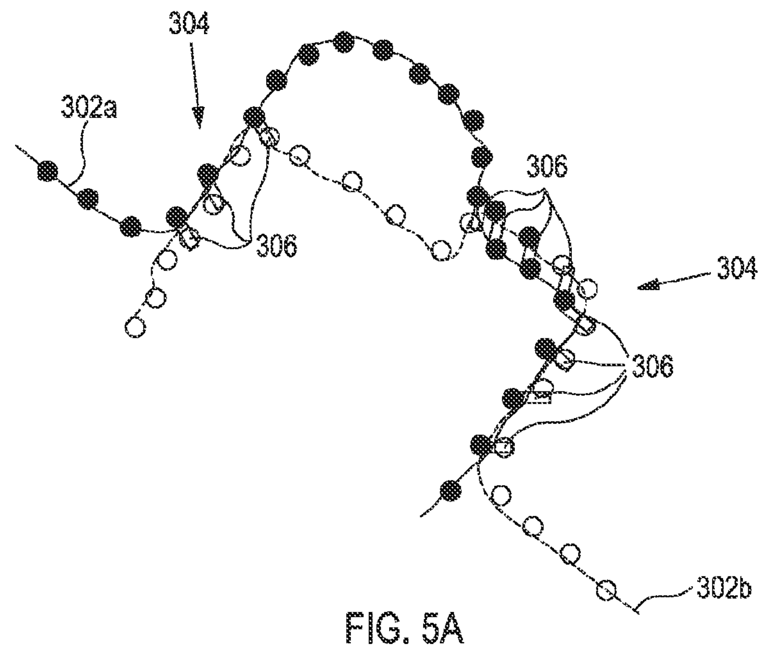
FIG. 5B illustrates a graph for a plurality of trajectories having had loop closure applied.
FIG. 5C illustrates the graph with a transformation applied, and overlaid onto a map of a building.
FIG. 5D illustrates the map of FIG. 5C, with candidate transitions identified.

FIG. 5A illustrates two trajectories 302*a*, 302*b* to schematically demonstrate loop closure techniques. A first trajectory 302*a* is represented by solid lines and filled dots. A second trajectory 302*b* is represented by dashed lines and open dots. Each dot represents a position node on the trajectory determined by various positioning or dad reckoning techniques, as discussed above.

As can be seen from FIG. 5A, there are a number of regions 304 in which the position of the first trajectory 302*a* corresponds to the position of the second trajectory 302*b*. At these points, the two trajectories are determined to be at the same (or similar) location, and so a loop closure 306 is formed.

Figure 5B:
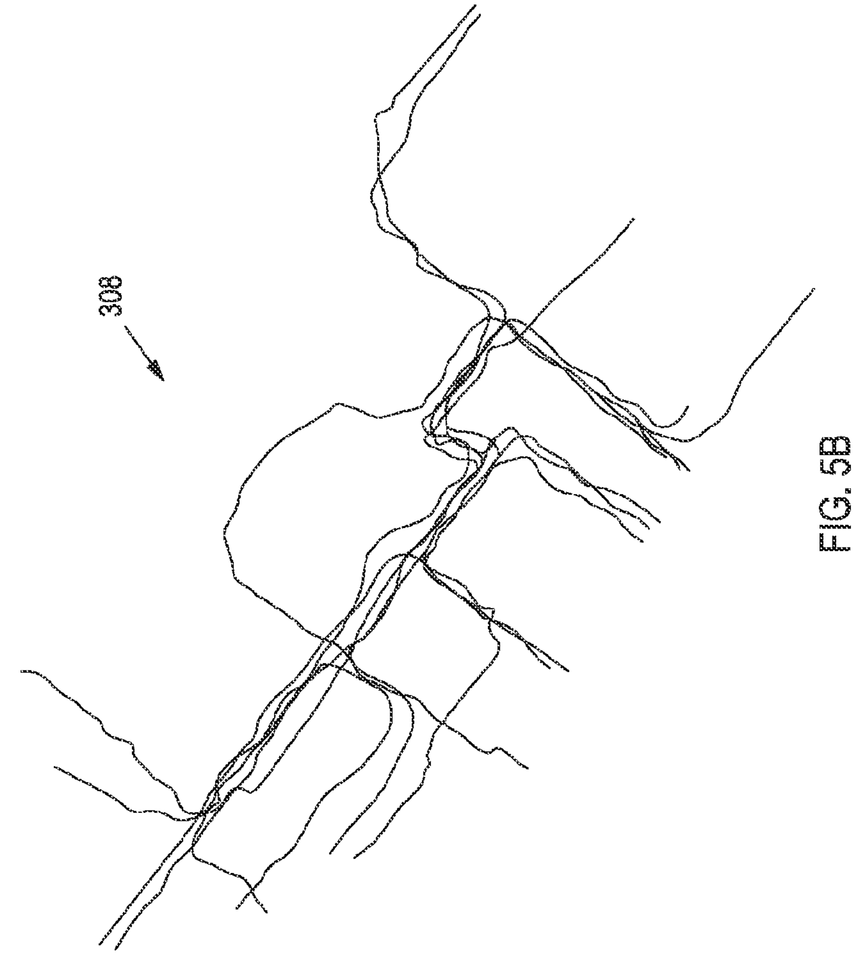

FIG. 5B illustrates the graph 308 formed as the outcome of the step of positioning the trajectories 302 relative to each other for a larger collection of trajectories 302. As can be seen in FIG. 5B, not all of the trajectories overlap every other trajectory, and the overlaps are formed in different positions. As a result of the processing, the trajectories can be positioned relative to each other in a common frame of reference. It will be appreciated that even when only a small part of a trajectory overlaps other trajectories, the loop closure technique can provide that trajectory in the frame of reference of the graph 308.

It will be appreciated that any suitable technique for forming loop closures 306 may be used. However, in one example, various Simultaneous Localization and Mapping (SLAM) techniques may be used in order to process the collection of trajectories 302 together. To apply SLAM techniques, the processing unit 100 may include a SLAM module (not shown).

Figure 5C:
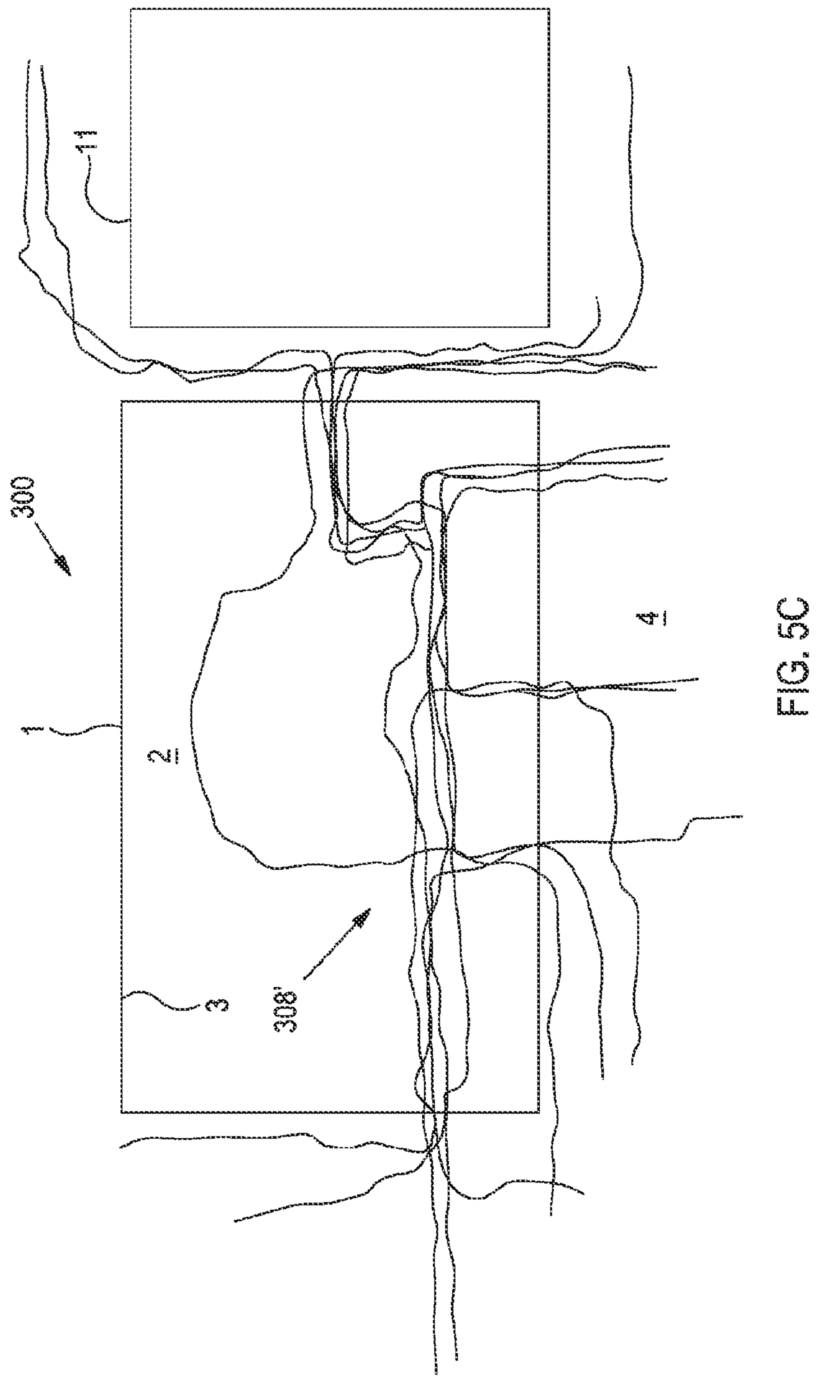

The third step 406 of the method 400 is to apply a rigid or non-rigid transformation to the graph 308 of the trajectories, to transform the graph into a reference frame defined relative to the map 300. The transformed graph 308' is then overlaid onto the outline of the exterior wall 3 of the building 1 on the map 300, as shown in FIG. 5C.

Since the combined graph 308' of the trajectories 302 is used, it will be appreciated that a plurality of trajectories can be provided in the co-ordinate space of the map 300, with only a limited number of points on the trajectories 302 having known position on the map 300. These points can be considered anchor points for the transformation.

In one example, three or more anchor points may be used to apply the transformation. The anchor points may be based on GNSS data, or any other suitable data which provides a fixed position of one of the position nodes of the trajectories in the frame of reference of the map 300.

It will be appreciated that the step 404 of positioning the trajectories 302 relative to each other and the step 406 of applying the transformation may be applied simultaneously, such that after the trajectories are collected, they are positioned on the map 300, based on anchor points of trajectories and correspondence between the trajectories 302.

At a fourth step 408, the map 300 including the transformed trajectories is processes to identify transitions 5*a-e*. The transitions 5*a-e* of the building 1 can be identified in a number of different ways, as will be discussed below in more detail.

A first method of identifying the doorways 5*a-e* of the building 1 is a boundary based approach. In this case, the location of the doorways 5*a-e* is identified by where the transitions cross the perimeter defined by the outer wall 3 of the building.

A number of optional refinements may be applied to the boundary approach, in order to help eliminate false positive. Such false positives may be, for example, where a user carrying a mobile device 13 walks alongside the wall 3, without ever entering/exiting the building 1.

One example refinement is that doorways 5*a-e* may only be identified where a cluster of trajectories 300 cross the perimeter. Another optional refinement would be to only consider the angle of each trajectory where it crosses the perimeter, and only consider trajectories 300 where the angle is above a threshold. A further optional refinement is to only consider trajectories that travel to/from a predefined distance away from the perimeter.

It will be appreciated that one or more of these refinements may be applied. Furthermore, a number of candidate 310 transitions may be identified by the boundary crossing approach (optionally using the above refinements), and then a transition only identified where a cluster 312 of candidates is found.

A second method of identifying doorways 5*a-e* of the building 1 is a signal gradient approach. As will be appreciated by the person skilled in the art, as a mobile device approaches a building, it may be able to access short range wireless communications signals form the building 1. This may be, for example, WiFi or BlueTooth. Therefore, when approaching a building 1, the number of this type of access points that are available, and the signal strength may increase.

Similarly, when approaching a building 1, other signals, such as GNSS signals, and mobile cellular signals may decrease in strength and availability.

Due to line of sight, and other interference effects, the signal gradients may change away from the wall 3. However, by examining the changes in the signal, a number of candidate transitions 310 may be identified. Clusters 312 of candidate transitions 310 may then be identified as doorways 5*a-e*.

In further examples, a combination of the boundary approach and the signal gradient approach may be applied. For example, candidates may be identified using any of the above techniques. Alternatively, only parts of the boundary of the building 1 that are close to high signal gradient areas may be used, and/or only high signal gradient areas that are close to the boundary of the building 1 may be used.

Figure 5D:
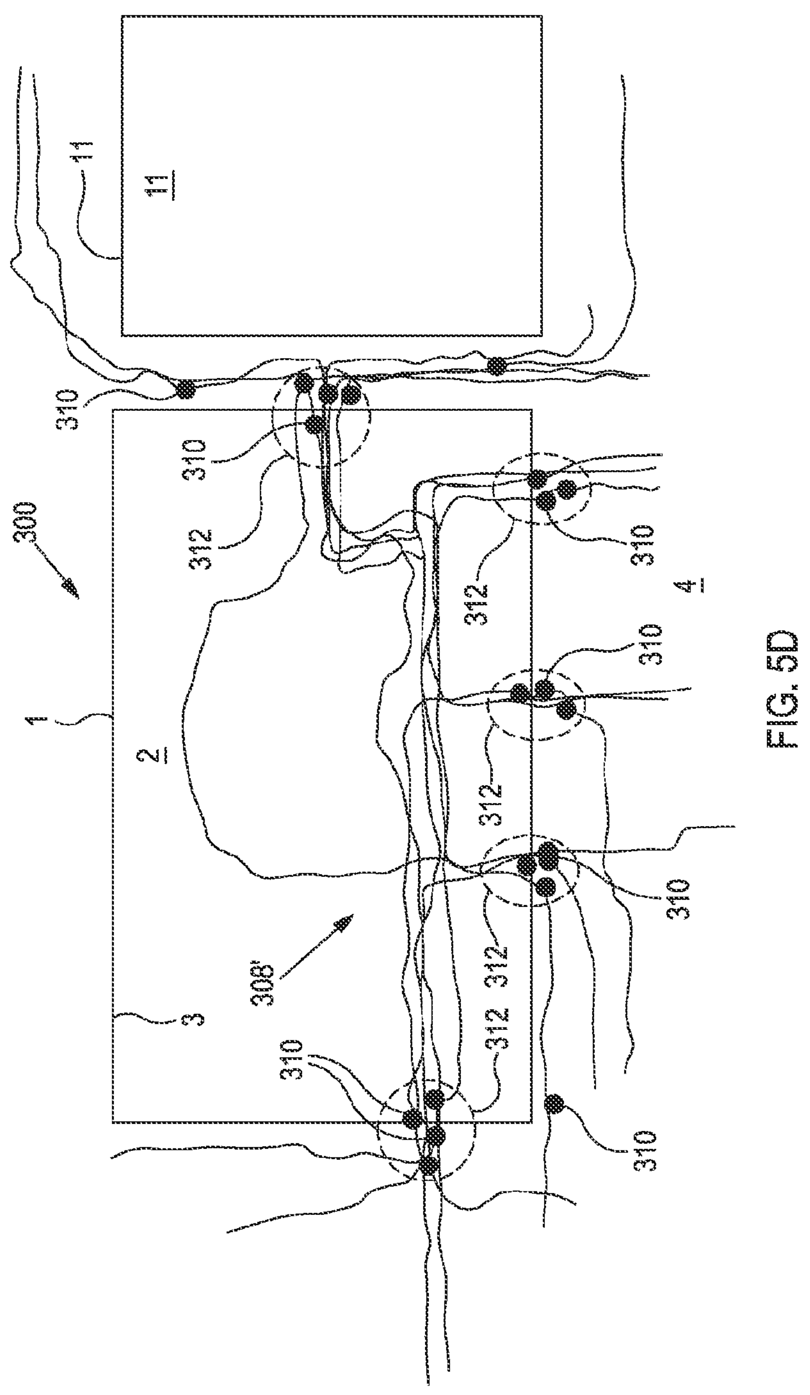

FIG. 5D shows examples of identified candidates 310 and clusters 312 of candidates. The doorways 5*a-e* would be identified where the boundary of the cluster 312 cross the exterior wall 3 of the building 1.

A number of different examples of methods for determining candidate transitions 310 have been explained, in order to determine the location of the doorways 5*a*-5*e*. In each of these examples, the candidate transitions 310 may be referred to by a time stamp in the data series comprising the trajectories, and/or a co-ordinates in the data series comprising the trajectory. The time stamp and/or co-ordinate may identify an individual reading (node) in the data series or a short sequence of readings.

Depending on the method used to identify the candidate, the time at which the transition occurred may be determined instead of or as well as the location relative to the map. For example, where the candidates are identified without reference to the boundary of the building defined on the map, such as by using signal gradients, only the time at which the transition occurred may be determined, or the time may be determined in addition to the location.

Furthermore, once doorways 5*a*-5*e* have been identified on the map, this information can be used to determine which doorway 5*a*-5*e* future trajectories pass through, and at what time.

Prior to the method 400, one or more pre-processing filtering steps may optionally be applied to the trajectories 300.

In one pre-processing filter, trajectories 300 that are estimated to have inaccurate relative motion information, such as an unrealistic sequence of position nodes are rejected. Accuracy may also be estimated by observing the spatial extent of the trajectory per unit time. The spatial extent could be measured as the length of the diagonal of a bounding box that encloses all nodes of the trajectory. When the spatial extent per time unit is lower than a threshold, which may or may not depend on the size of the building, the trajectory is considered inaccurate and removed from consideration in the following steps.

In a further pre-processing filter, poor quality signals, e.g. WiFi signals with very few access points, or cellular signals with very few cellular towers are removed. To reduce the processing cost of the method 400, signals may optionally be subsampled using either a time interval threshold between samples, or a travelled distance threshold between samples. Alternatively, samples of a given time or distance interval may be combined to obtain a single sample. If the majority of signals associated with a trajectory 300 are of poor quality and removed, then the entire trajectory 300 may be removed. Alternatively, a part (first and/or last segment) of a trajectory 300 with poor quality signals may be removed.

In order to carry out the step 404 of positioning the trajectories 300 relative to each other in a single graph 308, and transforming the graph 308 into a single frame of reference, the relative shape of the trajectories may be modified or transformed.

A number of different types of constraints may be used to control the modification of the trajectories 300. The constraints limit how different portions of trajectories can be modified and are where different portions of trajectories are positioned in the final frame of reference. Examples of the constraints used include: relative motion constraints, absolution location constraints, and loop closure constraints.

Relative motion constraints control how different nodes (such as step length, step turn pairs) or sub-sequences of nodes within a trajectory are arranged relative to each other. Each node or subsequence of nodes has an uncertainty (or confidence) associated with it. The uncertainty determines the likelihood that the associated part of the trajectory will be changed. For example, if a series of nodes has high confidence, that series is likely to be maintained in its shape, while a series with low confidence may be altered.

Relative motion constraints are represented by the x and y distance on a local frame, and co-variance (confidence) information, which may depend on the number of steps combined or on the spatial extent of the trajectory 300, or from prior information on the quality of relative motion information associated with the type of sensor, inferred attachment, or mobile device used.

Alternatively, step length uncertainty and step turn uncertainty could be provided as part of the input, complementing information about step length and step turn. If absolute step orientation data is available the constraint would involve x and y distance on a global frame and co-variance information.

Absolute locations constraints provide fixed positions in the final frame of reference. Any trajectory 300 having a time stamp associated with a high accuracy GNSS measurement (or any other measurement in a global frame) may provide absolute location information, which can be represented with the following type of constraint. A landmark (reference) location which is the mean of all high accuracy GNSS locations is defined. Distance constraints that link every position node with high accuracy GNSS location with that landmark location are created. The distance is the actual Euclidean distance between the two locations, and the uncertainty is based on the uncertainty of the GNSS location of that node. Again, the uncertainty is encoded in a co-variance matrix. In addition, the uncertainty may also be estimated by taking into account the frequency, proximity and reported accuracy of GNSS estimates in a small window surrounding that GNSS measurement.

Loop closures 306 are defined when, for example, one signal (or a sequence of signals) associated with one trajectory 302 has high similarity to another signal (or a sequence of signals) associated with another trajectory 302 (or another part of the same trajectory). In other words, when a loop closure is formed when two trajectories measure similar signals, and so the trajectories are determined to be at the same location. The signals need not necessarily have been used to determine the trajectory they may have simply been measured concurrently with the data that was used to measure the position node with a corresponding time stamp.

Loop closures 306 may be derived from a single signal modality (e.g. WiFi only) or a plurality of signal modalities (e.g. a combination of cellular, WiFi, magnetic, light, etc.). In an alternative embodiment, loop closures 306 could be formed by additionally taking into account the shape of the trajectories, i.e. relative motion information used to generate motion constraints. The uncertainty of loop closures 306 is derived based on statistics of the pairwise similarity between signals, e.g. their number, similarity values and variance, and optionally based on the shape similarity.

A non-linear optimiser back end is used to estimate relative poses that best satisfy the three constraints discussed above (relative motion constraints, absolute location constraints and loop closures), providing as output a node graph, where each node is associated with an estimate of relative locations (x,y) and variances thereof.

The confidence of a loop closure is a measure of how likely the loop closure is to be correct. For example, where loop closure is determined based on the similarity of measured signals, the confidence is determined based on how similar the two signals are. Where a combination of signals are used to determine loop closures, the similarities of the different signals would be combined. The confidence is used to bring different parts of trajectories closer together, when position the trajectories relative to each other (e.g. where there is high confidence in a loop closure, the trajectories are brought closer together than where there is low confidence).

If the estimated confidence is too low, loop closures do not draw the corresponding trajectories close enough so the overall solution fails to correctly align trajectories. On the other hand, if the estimated confidence is too high, the trajectories are distorted to satisfy the spurious loop closures.

In pedestrian tracking applications, it is often difficult to detect loop closure with high confidence using opportunistic signals like Wifi and cellular. Optionally, to address this, multiple iterations of the loop closure procedure, for example the SLAM algorithm, may be applied. Different uncertainty estimates can be used in the first and second iterations of the process. A high uncertainty (low confidence) for loop closures is applied in the first iteration. The uncertainty is then reduced for those loop closures that are well satisfied by the output of the first SLAM iteration, and the uncertainty is increased for the remaining loop closures.

WO 2019/025788, the contents of which are hereby incorporated by reference, provides details on one method of providing loop closures between trajectories.

The uncertainty of loop closures in the second iteration may be defined as a function of the uncertainty they had in the first iteration, and the distance between loop closure segments in the output of the first SLAM output. In other words, the loop closures that are well satisfied are positively reinforced, and those that are not well satisfied are negatively reinforced (or rejected).

Another possible refinement in the second iteration is to identify the trajectories that have a large percentage of their steps being highly distorted by the output of the first SLAM iteration. These trajectories may be removed or alternatively, the uncertainty of the motion constraints of these trajectories may be increased, before running the second iteration of SLAM.

The refinements of the second step may be repeated in further iterations until convergence, i.e. until the output of the SLAM iteration is similar to the previous one.

After the graph 308 has been formed, the first and/or last part of each trajectory, that has no loop closure or absolute location constraints, (or that has insufficiently many constraints) may be removed.

If the absolute location constraints and/or the motion constraints generated from absolute orientation data are very noisy, it may be beneficial to not include them when performing the step of positioning the trajectories relative to each other, but to use them in the step 406 of transforming the graph 308 using a rigid and, optionally, a non-rigid transformation.

In an embodiment using a rigid transformation, the rigid transformation of the graph that best satisfies existing constraints on the location of some nodes from GNSS data and on the absolute orientation between pairs of nodes from the absolute step orientation data (if available). This rigid transformation includes an estimation of translation, scaling and rotation (and variances thereof), and therefore transforms the graph 308 into a global positioning reference frame.

In another embodiment of this step, the rigid transformation may be followed by a non-rigid transformation refinement step. For example, the "As Rigid As Possible Surface Modelling" (ARAP) algorithm [O. Sokrine and M. Alexa] may be applied as follows. A regular grid of triangles is generated as an overlay to the graph 308, and each node in graph 308 is associated with a triangle in the grid. The ARAP algorithm is then applied on the grid using point to point correspondences between each triangle associated with one or more nodes that have GNSS measurements, and the mean value of these GNSS measurements. After applying ARAP, the locations of graph nodes are updated with the new values of the triangle locations that they are associated with.

In the ARAP transformation step, absolute orientation information associated with the edges of the graph 308 may be taken into account to constrain the allowable rotation of these edges. This absolute orientation information on a given edge of the graph is translated to absolute orientation information between two neighbour triangles in the ARAP grid, and is then used to constrain their relative position.

As discussed above, only trajectories 300 within the vicinity of the building 1 are considered. This may be defined by a geo-fence, an available map or any other means. For example, this may be applied as a pre-processing step, or as a step occurring after the transformation of the graph 308.

Furthermore, trajectories 300 having a portion of the trajectory 300 outside the desired area may be completely removed, or only the part outside the desired area may be removed.

It will be appreciated that the method 400 discussed above may be wholly performed at the processing system 100. Alternatively, parts of the method 400 may be performed at the mobile device(s) 13 which measure the trajectories 300. It will also be appreciated that the processing system 100 may be formed by one of the mobile device 13.

It will also be appreciated that, whilst the method 400 has been discussed in relation to doorways 5*a-e* in to and out of a building, the method may be used to any zone transition. This includes internal-external transitions, internal-internal transitions and external-external transitions.

The invention claimed is:

1. A computer implemented method implemented by steps stored in non-transient memory on a first computer for determining a location of one or more transitions on a map stored in the non-transient memory and/or the time at which one or more transitions occurs, the one or more transitions made by a set of mobile computing devices, from a first zone to a second zone, the method comprising:

obtaining trajectory data representing a plurality of trajectories collected from one or more mobile computing devices, at least some of the trajectories passing through the first zone and/or the second zone;

processing the plurality of trajectories to identify transitions by:

generating a pose graph of the plurality of trajectories located with reference to each other by identifying loop closures and relative motion constraints;

positioning the pose graph in a frame of reference defined relative to the map by applying a transform to the pose graph, wherein at least part of at least some of the trajectories are positioned in the frame of reference defined relative to the map based on their correspondence with other trajectories; and processing the plurality of trajectories positioned in the frame of reference defined relative to the map to determine the location and/or time of transitions from first zones of the map to second zones of the map by identifying clusters of trajectories in the pose graph, wherein the processing of the plurality of trajectories includes prior to generating the pose graph, removing trajectories or segments of trajectories having unreliable motion constraints, removing trajectories or segments of trajectories that are highly distorted by the process of forming the pose graph, and removing trajectories or segments of trajectories not having sufficient loop closures.

2. The computer implemented method of claim 1, wherein processing the plurality of trajectories positioned in the frame of reference defined relative to the map to determine the location and/or time of transitions from first zones of the map to second zones of the map comprises:

identifying candidate transitions in each trajectory; and determining transitions based on groupings of candidate transitions.

3. The computer implemented method of claim 2, wherein candidate transitions are determined based on a signal gradient of a signal received at the one or more mobile computing devices exceeding a threshold.

4. The computer implemented method of claim 2, wherein candidate transitions are determined based on where trajectories cross boundaries defined on the map.

5. The computer implemented method of claim 4, wherein a candidate transition is identified when the trajectory crosses the boundaries defined on the map at an angle exceeding a threshold.

6. The computer implemented method of claim 1, wherein processing the plurality of trajectories positioned in the frame of reference defined relative to the map to determine the location and/or time of transitions from first zones of the map to second zones of the map comprises:

identifying regions where a group of trajectories cross a boundary defined in the map.

7. The computer implemented method of claim 1, comprising determining the location of a transition, in the frame of reference defined relative to the map.

8. The computer implemented method of claim 1, wherein the trajectories are determined based at least in part on inertial data from the one or more mobile computing devices.

9. The computer implemented method of claim 8, wherein a subset of the trajectories are determined without any position data relative to the map.

10. The computer implemented method of claim 8, wherein at least some of the trajectories are non-overlapping in the frame of reference of the map.

11. The computer implemented method of claim 1, wherein positioning the trajectories in a frame of reference defined relative to the map comprises:

processing the plurality of trajectories to position the trajectories relative to each other in a common relative co-ordinate space;

processing the trajectories to transform the relative co-ordinate space into the frame of reference defined relative to the map.

12. The computer implemented method of claim 1, wherein each trajectory includes a plurality of position points, and wherein positioning the trajectories in a frame of reference defined relative to the map comprises:

determining three or more points on the trajectories having a fixed position in the frame of reference of the map; and positioning the points without fixed position in the frame of reference of the map based on the trajectories and correspondence between features of the trajectories.

13. The computer implemented method of claim 12, wherein the three or more points are taken from one or more of the plurality of trajectories.

14. The computer implemented method of claim 1, wherein correspondence of trajectories is determined based at least in part on features of signals received by the one or more mobile computing devices along the trajectories.

15. The computer implemented method of claim 3, wherein the received signal comprises one or more of: a wireless signal; a GPS signal; a cellular communications signal; an IMU (inertial measurement unit) signal.

16. The computer implemented method of claim 1, wherein correspondence of trajectories is determined based at least in part on position data of the trajectories in the frame of reference of the map and optionally on position data of features of the map.

17. The computer implemented method of claim 1, wherein positioning the trajectories in a frame of reference defined relative to the map comprises using a Simultaneous Localisation and Mapping module to process the plurality of trajectories.

18. The computer implemented method of claim 17, comprising using the Simultaneous Localisation and Mapping module to process the plurality of trajectories to position the trajectories relative to each other in a common relative co-ordinate space.

19. The computer implemented method of claim 1, wherein the first zone and the second zone comprise indoor and outdoor regions of the map, such that the transitions comprise an indoor/outdoor transition.

20. The computer implemented method of claim 1, wherein at least a portion of each of the trajectories is within a geo-fence defined in the frame of reference of the map, the geo-fence incorporating the first zone and the second zone.

21. The computer implemented method of claim 1, wherein the unreliable motion constraints identified by co-variance information are dependent on at least one of the number of steps combined, the spatial extent of the trajectory and from stored information on the quality of relative motion information associated with the type of sensor, inferred attachment, or mobile device used and trajectories or segments of trajectories not having sufficient loop closures are identified based on calculations identifying the position the trajectories relative to each other.

22. The computer implemented method of claim 1, further including overlaying the processed plurality of trajectories onto the map as a part of positioning the pose graph in a frame of reference defined relative to the map.

23. The computer implemented method of claim 1, further including marking the identified transitions on the map.

24. The computer implemented method of claim 1, wherein generating a pose graph of the plurality of trajectories located with reference to each other by identifying loop closures and relative motion constraints comprises performing multiple iterations of a loop closure procedure, wherein a confidence is assigned to each loop closure identified in a first iteration, and in subsequent iterations, the confidence for loop closures well satisfied by the pose graph generated in previous iterations is increased and the confidence for loop closures not well satisfied by the pose graph generated in previous iterations is decreased.

25. An apparatus implementing steps stored in non-transient memory for determining a location and/or time of one or more transitions on a map stored in the non-transient memory, made by a set of mobile computing devices, from a first zone to a second zone, the apparatus comprising:

a transition detector comprising processing circuitry implementing the steps stored in the non-transient memory and arranged to:

obtain trajectory data representing a plurality of trajectories collected from one or more mobile computing devices, at least some of the trajectories passing through the first zone and/or the second zone;

process the plurality of trajectories to identify transitions by:

determining a pose graph of the plurality of trajectories located with reference to each other by identifying loop closures and relative motion constraints;

positioning the pose graph in a frame of reference defined relative to the map by applying a transform of the pose graph, wherein at least part of at least some of the trajectories are positioned in the frame of reference defined relative to the map based on correspondence with other trajectories; and processing the plurality of trajectories positioned in the frame of reference defined relative to the map to determine the location and/or time of transitions from first zones of the map to second zones of the map by identifying clusters of trajectories in the pose graph, wherein the processing of the plurality of trajectories includes prior to generating the pose graph, removing trajectories or segments of trajectories having unreliable motion constraints, removing trajectories or segments of trajectories that are highly distorted by the process of forming the pose graph, and removing trajectories or segments of trajectories not having sufficient loop closures.

26. A non-transient computer-readable medium containing instructions which, when run on a system including processing circuitry, cause that system to:

obtain trajectory data representing a plurality of trajectories collected from one or more mobile computing devices, at least some of the trajectories passing through a first zone on a map and/or a second zone on the map, the map being stored in non-transient memory;

process the plurality of trajectories to identify transitions by:

determining a pose graph of the plurality of trajectories located with reference to each other by identifying loop closures and relative motion constraints;

positioning the pose graph in a frame of reference defined relative to the map by applying a transform of the pose graph, wherein at least part of at least some of the trajectories are positioned in the frame of reference defined relative to the map based on correspondence with other trajectories; and processing the plurality of trajectories positioned in the frame of reference defined relative to the map to determine the location and/or time of transitions from first zones of the map to second zones of the map by identifying clusters of trajectories in the pose graph, wherein the processing of the plurality of trajectories includes prior to generating the pose graph, removing trajectories or segments of trajectories having unreliable motion constraints, removing trajectories or segments of trajectories that are highly distorted by the process of forming the pose graph, and removing trajectories or segments of trajectories not having sufficient loop closures.

* * * * *